United States Patent [19]

Höfer et al.

[11] Patent Number: 4,463,148
[45] Date of Patent: Jul. 31, 1984

[54] CONTACT LENS AND COMPOSITIONS

[75] Inventors: Peter Höfer, Aschaffenburg; Ulrich Müller, Johannesberg; Manfred Bärenz, Dreieich; Horst Schäfer; Wolfgang Müller-Lierheim, both of Aschaffenburg, all of Fed. Rep. of Germany

[73] Assignee: Titmus Eurocon Kontaktlinsen GmbH KG & Co., Aschaffenburg, Fed. Rep. of Germany

[21] Appl. No.: 490,209

[22] Filed: May 6, 1983

Related U.S. Application Data

[63] Continuation of Ser. No. 226,674, Jan. 21, 1981, abandoned.

[30] Foreign Application Priority Data

Jan. 25, 1980 [DE] Fed. Rep. of Germany ....... 3002664

[51] Int. Cl.$^3$ ............... C08F 220/20; G02C 7/04
[52] U.S. Cl. ............... 526/264; 351/160 H; 526/307.5; 526/312
[58] Field of Search ............ 526/264, 307.5, 312, 526/317

[56] References Cited

U.S. PATENT DOCUMENTS 3,937,680  2/1976  de Carle ............... 526/264
4,036,788  7/1977  Steckler ............... 526/264

Primary Examiner—Harry Wong, Jr.
Attorney, Agent, or Firm—Felfe & Lynch

[57] ABSTRACT

A soft contact lens having in preferred embodiment an elliptical inside surface which has a numerical eccentricity of 0.2 to 0.5 and a zenith radium of curvature of 8.0 to 8.4 mm. It preferably consists of a copolymer comprising of 50% to 90% hydroxyethyl-methacrylate (HEMA) by weight, 2% to 20% one or more unsaturated carboxylic acids, 2% to 20% one or more base monomers, 5% to 25% aliphatic acrylate or methacrylate, and 0.1% to 1% of a dialkylene-glycol-dimethacrylate crosslinker.

6 Claims, 2 Drawing Figures

CONTACT LENS AND COMPOSITIONS

This application is a continuation of application Ser. No. 226,674, filed Jan. 21, 1981, and now abandoned.

BACKGROUND OF THE INVENTION

It is known that the inside surface of a contact lens, i.e., the surface which lies on the cornea, must be aspherical, more specifically, elliptical, in order to adapt to the surface of the human cornea ("The Contact Lens", 9th year of publication, Volume 3, 1974, pages 211 to 217).

Despite intensive research, a soft contact lens has still not been developed with a single internal geometry suitable for the majority of wearers, i.e., fitting a substantial range of corneal sizes, within a relatively wide vertex refractive range.

SUMMARY OF THE INVENTION

The purpose of the present invention, therefore, is to develop a geometry for the inside surface of a lens, in particular a soft lens, which will obviate the necessity of fitting lenses for a wide range of corneal sizes (i.e., central corneal radii), yet be applicable to a wide vertex refractive range, more specifically, from $-25$ to $+25$, more usually from $-7$ to $+5$ diopters.

The invention provides a lens geometry in which all plane sections of the inner surface of the lens also containing its optical axis are elliptical and have a numerical eccentricity between 0.1 and 0.6 mm, more particularly, from 0.2 to 0.5 mm, and a zenith radius of curvature of 7.0 to 9.6 mm, more particularly, of 8.0 to 8.4 mm, and typically of 8.2 mm. Thus, the inventive lens geometry comprises an inner (concave) lens surface generated by rotating an ellipse of the indicated eccentricity on the longer elliptical axis, i.e., to form a rotation ellipsoid. In preferred aspect, the end portions of the rotation ellipsoid are provided with tangentially connecting bevelled zones as more fully described hereinbelow.

The efficacy of the present invention in providing, with a single internal geometry, a wide range of fit is particularly unexpected because soft contact lenses generally exhibit greater variations in central lens thickness and maximum depth differences (at a constant central radius) than, e.g., hard lenses and, because of the generally larger diameter of the soft lenses, the tensioning and distorting forces thereon are greater.

The present invention is applicable to soft contact lens material having a rupture elongation of 100–500%, preferably 120–250%, and a Shore A hardness of 15 to 75, especially 20 to 50. The invention is thus characterized by a combination of earmarks involving both geometrical parameters and lens material characteristics.

The advantage of the invention is illustrated by the following: Given a single internal geometry, wherein the lens has an eccentricity of 0.25 or 0.3 to 0.4, and a zenith radius of curvature of 8.0 to 8.4 mm, a relatively few lenses provide a wide range of fit. For an eccentricity of 0.36, and a zenith radius of curvature of 8.2 mm, only 49 lenses are required for a vertex refractive range of $-7$ to $+5$ diopters, graded in $\frac{1}{4}$ diopters.

Within the given vertex refractive range, it is no longer necessary to fit the lenses and select the best internal geometry, at least in the case of contact lens wearers with central corneal radii of 7.3 to 8.3 mm, and a visible iris diameter of 10.8 to 12.4 mm. It is sufficient to determine the refraction, and to inspect the anterior eye sections, before inserting the lens, which is equivalent to the best spherical lens, taking into account the altered corneal zenith distance.

All that is then required, as is usual in all lens fitting, is to check for optimal lens positioning and movement after $\frac{1}{2}$ to 2 hours, and possibly to modify the correction.

A further purpose is to ensure that the lens lies flat against the central cornea, whereby, due to the presence of a bevelled zone, wherein the elliptical base curve runs towards the lens edge into the peripheral bevelled zone with a circular cross section, the width of which is 0.1% to 4% of the total lens diameter and when the lens is placed horizontally the profile curve of the bevelled zone meets a vertical line constructed through the lens edge at a right angle, the mobility of the lens is improved, particularly when the wearer moves his eyes or blinks. A bevelled zone with the measurements cited prevents the lens edge from "burrowing" into the eye, should the lens slip from a steeper part of the eye to a flatter part. The bevelled zone, the form of which is exactly determined, causes the formation of a meniscus of lacrimal fluid, which controls lens movement. It is essential that the elliptical base curve of the inside lens surface continue uninterruptedly into the bevelled zone, which has a circular section, and an opposite course of curve. Thus the lens has good mobility and is always satisfactorily centered.

The geometry of the present invention is applicable to soft contact lenses. The present invention is also and in particular applicable to soft contact lenses such as those made from hydroxyethyl-methacrylate (HEMA), silicone rubber lenses and the like. In addition, the invention is most particularly applicable to soft contact lenses comprising the copolymers described hereinafter.

The most suitable material for the soft contact lens described above, is the copolymer consisting of 50% to 90% hydroxyethyl-methacrylate (HEMA) by weight, 2% to 20% or more unsaturated carboxylic acids, 2% to 20% one or more basic monomers, 5% to 25% aliphatic methacrylate and 0.1 to 1% dimethacrylate polymerizer of the homologous series starting with diethyleneglycol-dimethacrylates, or a mixture of glycol dimethacrylates. This copolymer can, however, also be used for contact lenses with a different geometry. The five-component copolymer described has an extremely high tensile strength, ensures a uniform degree of expansion over the entire lens body, and permits a water content of 40% to 90% (preferably 60%), depending on the proportion of other components.

Poly-HEMA, the main component of the copolymer permits only a relatively low water content of approximately 40%. In order to increase the water content, the copolymer contains an unsaturated carboxylic acid such as acrylic acid or methacrylic acid, which, however, displaces the isoelectric point into the acid range. This can encourage the build-up of undesirable proteinaceous deposits. Its action is compensated by addition of a base monomer such as acrylamide, methacrylamide, dimethylaminoethyl methacrylate, dimethylaminopropyl methacrylate, N-vinyl pyrrolidone or N-vinyl-δ-lactam. A copolymer consisting of these three components permits an increased water content, but has low tensile and tear strength. Addition of an aliphatic methacrylate, such as an aliphatic ester of the acrylic acid or methacrylic acid, increases tear strength, but the material then exhibits an unacceptably high degree of expansion (swelling). This can be inhibited by the cross-linking agent. The cross-linker mentioned above, and in particular dimethacrylate of the homologous series starting with diethylene-glycol-dimethacrylate, or mixtures of such homologs which cross-link elastically, however, so that when the lens is hydrated, stresses in the lens material is avoided while tear strength is maintained. Useful cross-linkers include ethylene-, diethylene-, dipropylene-, and triethylene-glycol-dimethacrylate. Thus in combination, the properties of the five components of the copolymer complement each other, as can be seen from the above.

The center thickness of the lens can be from 0.02 to 0.6 mm. In a preferred embodiment, the center thickness of the fully hydrated lens is 0.04 to 0.30 mm, more specifically 0.02 to 0.25 mm, and the final diameter of the fully hydrated lens is 12.5 to 14.0 mm, preferably 12.5 to 13.5 mm.

Another specific HEMA-based material is a polymer hydrogel made by photopolymerizing hydroxyethylmethacrylate in the absence of a cross-linking agent, as described in U.S. Pat. No. 4,073,577, issued on Feb. 14, 1978. This material has a number of desirable properties in terms of wearability, oxygen permeability and is well suited to the geometry provided by the present invention.

Still further, the so-called "soft-silicone" lens materials and the soft-polyurethane lens materials previously described in the literature can be shaped into lenses according to the present invention in advantageous manner.

In general, as set forth hereinabove, the eccentricities of such lenses, i.e., either the HEMA-based lenses or the soft silicone or soft polyurethane lenses, range from 0.10 to 0.60 mm and, within this range, from 0.2 to 0.5 mm; the base radius of curvature ranges from 7.00 to 9.600 mm, more particularly, from 8.0 to 8.4 mm, typically, 8.2 mm. The diameter range of the soft contact lenses according to the invention is from 12.50 to 15.00 mm, preferably from 12.50 to 14.00 mm; and the center thickness can range from 0.02 to 0.60 mm.

The bevel width of the bevel portion of the soft contact lenses of the invention can be from 0.5 to 10%, preferably 0.5 to 4%, and most preferably from 0.5 to 2.5% of the total lens end diameter; e.g., the bevel width is from 0.20 to 0.50 mm in the case of the soft polyurethane lens material, from 0.25 to 0.50 mm in the case of the soft silicone lens material and, typically, 0.21 mm for the HEMA-based soft contact lens material.

The appended drawings set forth a schematic representation of an embodiment of the invention to illustrate the invention in more detail. In the drawings, FIG. 1 is a section of one-half of a contact lens, enlarged 20 times, which represents the form of implementation of the invention in the hydrated state; and FIG. 2 is an illustration, enlarged 62.5 times, of a section of the bevelled zone of the contact lens shown in FIG. 1, in the hydrated state.

DETAILED DESCRIPTION OF THE INVENTION

Figure 1:
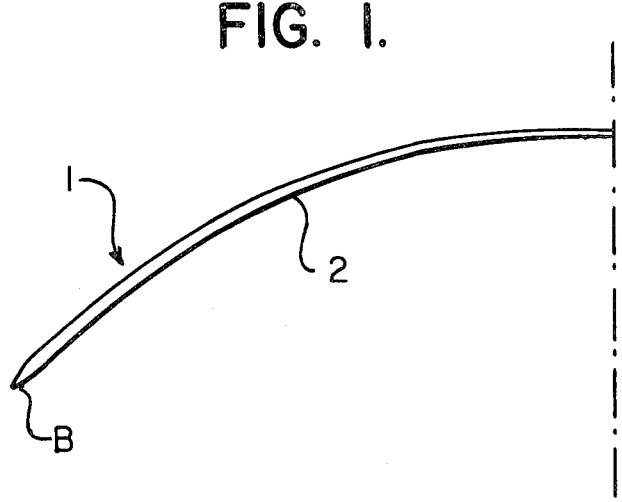
Figure 2:
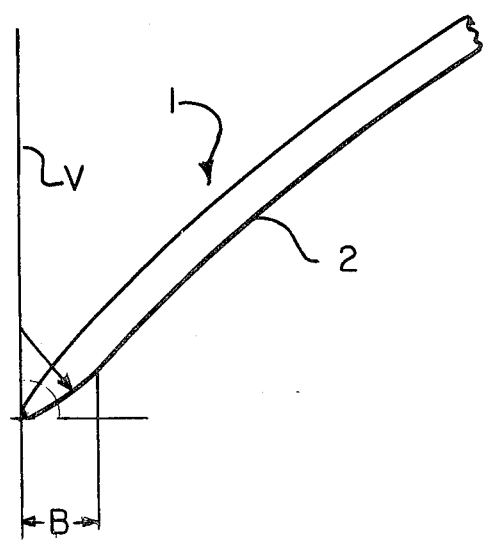

A contact lens 1, as shown in FIGS. 1 and 2, with an eccentricity of 0.36 and a final diameter of 9.35, has an inside surface with elliptical curvature, and a peripheral bevelled zone with a width of, for example, 0.15 mm, as shown in greater detail in FIG. 2. As can be seen from FIGS. 1 and 2, the elliptical base curve of the inside surface 2 runs seamlessly, i.e., tangentially, into the curved surface of the bevelled zone B, in such a way that the line of intersection of the bevelled zone at a right angle meets a vertical V constructed through the outer edge at a right angle. The same type of geometry can be used for a lens having an eccentricity of 0.48 and a diameter, in its fully hydrated condition, of 13.00 mm.

The illustrated elliptical curvature of the inside surface 2, and the circular cross section of the bevelled zone B, which cross each other seamlessly, or at a tangent, can be cut by means of an elliptical and circular tool, such as a diamond, when the lens is in the dehydrated state, i.e., when it is rigid. The standard procedure is then followed: the lens is polished, cleaned and hydratized, by means of, for example, physiological saline solution, and a final check of the optical parameters is carried out. The finished lens can then be stored in, for example, physiological saline solution again, and autoclaved.

An example of implementation of the invention is cited below.

EXAMPLE 1

HEMA-based Copolymer Lens Material

In the non-hydrated state, the lens has a diameter of 9.19 mm, and a bevel width of 0.15 mm. The numerical eccentricity of the elliptical inside surface is 0.36. The contact lens material consists of a copolymer with the following composition:

HEMA 77.8% by weight
Vinyl pyrrolidone 3.4% by weight
Methacrylic acid 5.2% by weight
Butyl-methacrylate 12.9% by weight
Triethylene-glycol-dimethacrylate 0.7% by weight The water content of the hydrated contact lens is 59% ± 1% by weight.

EXAMPLE 2

HEMA-based Copolymer Lens Material

A lens similar to that described in Example 1, but consisting of a copolymer material of the following composition can also be made according to the geometry of the instant invention:

HEMA 78.35% by weight
Vinyl pyrrolidone 3.5% by weight
Methacrylic acid 5.0% by weight
Butyl-methacrylate 13.0% by weight
Ethylene glycol dimethacrylate 0.15% by weight

EXAMPLE 3

HEMA-based Copolymer Lens Material (A) A lens similar to that described in Example 1, but consisting of a copolymer material of the following composition can also be made according to the geometry of the instant invention:

HEMA 74.5% by weight
Vinylpyrrolidone 7.05% by weight
Methacrylic acid 7.05% by weight
Butylmethacrylate 11.30% by weight
Triethyleneglycol dimethacrylate 0.10% by weight This lens has, in the non-hydrated state, a diameter of 9.19 mm, a bevel width of 0.15 mm and a numerical eccentricity of the inner surface is 0.48.

(B) The following copolymer can also be used:
HEMA 56% by weight
Methacrylic acid 18.5% by weight
Dimethylaminomethyl Methacrylate 15.5% by weight
Butylmethacrylate 5.0% by weight Triethyleneglycol Dimethacrylate 0.1% by weight

EXAMPLE 4

HEMA-based Homopolymer Lens Material

The material described in U.S. Pat. No. 4,073,577 and as prepared in Example 1 thereof is shaped into a lens having, in the hydrated state, a diameter of 13.0 mm, a zenith radius of curvature of 8.2 mm, and a bevel width of 0.18 mm. The numerical eccentricity of the elliptical inside surface is 0.36.

The composition of this lens is substantially 100% hydroxyethyl methacrylate (HEMA), and the water content of the hydrated contact lens is about 38% by weight.

EXAMPLE 5

HEMA-based Homopolymer Lens Material

A lens made as in Example 4 was shaped to have, in the hydrated state, a diameter of 13.0 mm, a zenith radius of curvature of 8.20 mm (in the range of the central 2.00 mm wide diameter section of the lens) and having a bevel width of 0.21 mm; the numerical eccentricity of the elliptical inside surface was 0.48.

The material exhibited a Shore hardness of 25–50 and an elongation at rupture of 120 to 250%.

EXAMPLE 6

Soft Silicone Rubber Based Lens Material

A lens was made from commercially available soft silicone rubber available for making contact lenses. In the non-hydrated state, the lens has a diameter of 12.5 mm, a zenith radius of curvature of 7.60 to 8.2 mm and a bevel width of 0.20 mm. The numerical eccentricity of the elliptical inside surface of the lens is 0.60.

In this lens the elliptical inner curve is of particular importance for preventing the silicone lenses from adhering by suction. The elliptical inner surface results in a constant floating effect of the lens, and the hydrophilicity of the surfaces is protected in that, because of the good sliding properties of the lenses, there is no contamination by proteins, lipids and muzins due to adhesion by suction or immobilization. To secure constant sliding properites, a lens diameter of 12.50 mm is preferably selected, the radius at the center of the inner curve ranging from about 7.80 to 8.40 mm. The bevel of a width of 0.20 enhances the constant sliding behavior of the lens. The numerical eccentricity, adapted to the special elasticity of the material, is 0.80. The deformation elasticity of the lens is 25 to 35%; Shore A Hardness is 45 to 60; and elongation at rupture is 400 to 500%.

EXAMPLE 7

Polyurethane Based Lens Material

Commercially available, highly water-absorptive, polyurethane lens material was used. In this lens, the elliptical inner geometry permits particularly good flooding with tear liquid under the lens, and hence optimum exchange of the metabolic products. In the fully hydrated condition, this lens has a diameter of 13.50 mm and a central radius of 8.20 mm. The width of the bevel is 0.18 mm. The numerical eccentricity of the elliptical inner surface is 0.48.

EXAMPLE 8

Another suitable contact lens material is produced by Duragel Limited, under the tradename DW 1 (Data Sheet DW 1 from the firm Duragel Limited, Meopham Trading Estate, Meophan, Gravesend, Kent DA 13 OLT). This material has a water content of 60%. It also permits the production of lenses with an elliptical inside surface having an eccentricity of 0.36, a final diameter of 9.35 mm, and a bevel width of 0.15 mm in the nonhydrated state.

It will be understood that the specification and examples are illustrative but not limitative of the present invention and that other embodiments within the spirit and scope of the invention will suggest themselves to those skilled in the art.

What is claimed is:

1. A soft contact lens comprising a copolymer, consisting of 50% to 90% hydroxy-ethyl-methacrylate (HEMA) by weight, 2% to 20% of one or more unsaturated carboxylic acids selected from the group consisting of acrylic acid and methacrylic acid, 2% to 20% one or more basic monomers selected from the group consisting of acrylamide, methacrylamide, dimethylaminoethyl methacrylate, dimethylaminopropyl methacrylate, N-vinyl-pyrrolidone and N-vinyl-delta-lactam, 5% to 25% of an aliphatic ester of acrylic acid or methacrylic acid and 0.1% to 1% of at least one dialkyleneglycol-dimethacrylate cross-linker selected from the group consisting of ethylene-diethylene-dipropylene-, and triethylene-glycol-dimethyacrylate.

2. The lens according to claim 1, wherein the unsaturated carboxylic acid is acrylic acid or methacrylic acid; the base monomer is acrylamide, methacrylamide, dimethyl-aminoethyl-methacrylate, dimethylaminopropyl methacrylate, N-vinyl pyrrolidone or N-vinyl-deltalactam; and the cross-linker is a diethlene- or dipropylene-glycol-dimethacrylate.

3. A lens as claimed in claim 1 as follows:
HEMA 77.8% by weight,
N-vinyl pyrrolidone 3.4% by weight,
methacrylic acid 5.2% by weight,
butyl-methacrylate 12.9% by weight, and
triethylene-glycol-dimethacrylate 0.7% by weight.

4. A lens as claimed in claim 1 as follows:
HEMA 78.35% by weight,
N-vinyl pyrrolidone 3.5% by weight,
methacrylic acid 5.0% by weight,
butyl-methacrylate 13.0% by weight, and
ethylene glycol-dimethacrylate 0.15% by weight.

5. A lens as claimed in claim 1 as follows:
HEMA 74.5% by weight,
N-vinyl pyrrolidone 7.05% by weight,
methacrylic acid 7.05% by weight,
butyl-methacrylate 11.30% by weight, and
triethylene-glycol-dimethacrylate 0.10% by weight.

6. A lens as claimed in claim 1 as follows:
HEMA 56% by weight,
N-vinyl pyrrolidone 18.5% by weight,
methacrylic acid 15.5% by weight,
butyl-methacrylate 5.0% by weight, and
triethylene-glycol-dimethacrylate 0.1% by weight.

* * * * *